Oct. 2, 1934.  A. McL. NICOLSON  1,975,517
PIEZO ELECTRIC CRYSTAL CONVERTER GENERATOR
Filed May 2, 1931  3 Sheets-Sheet 1
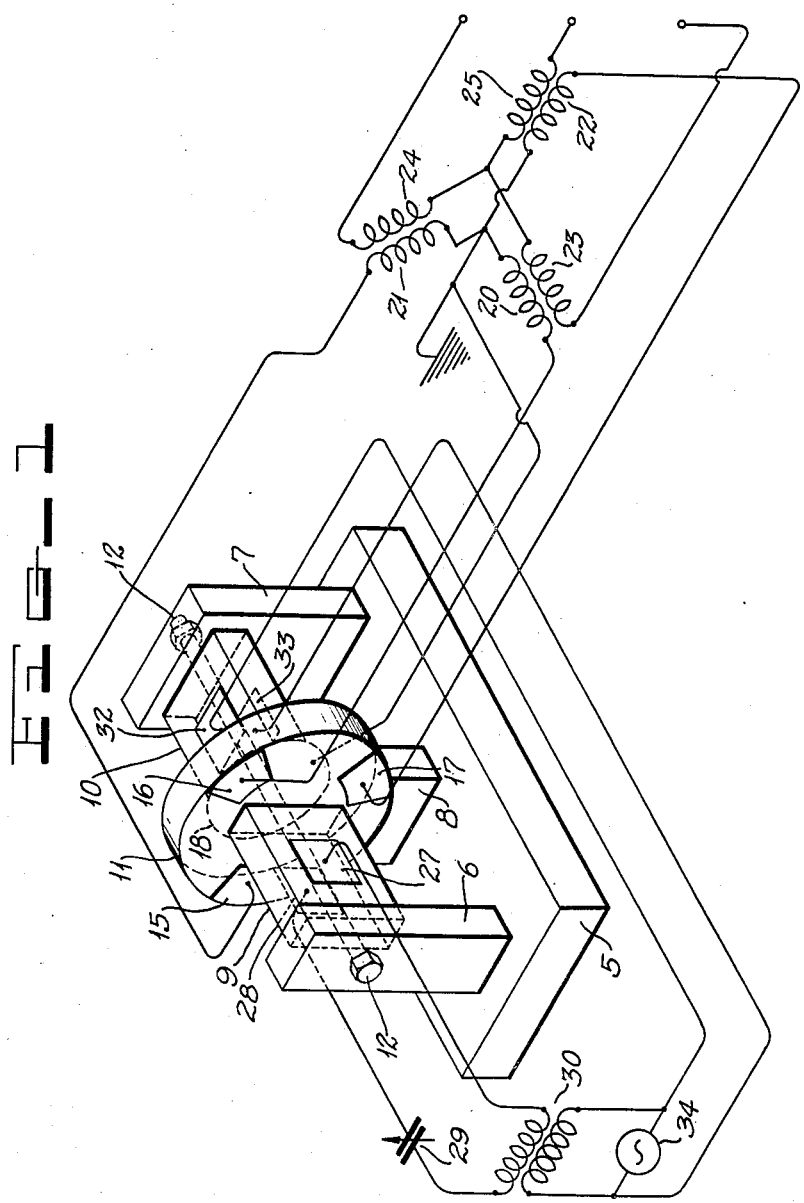
INVENTOR
Alexander McLean Nicolson
BY
ATTORNEY

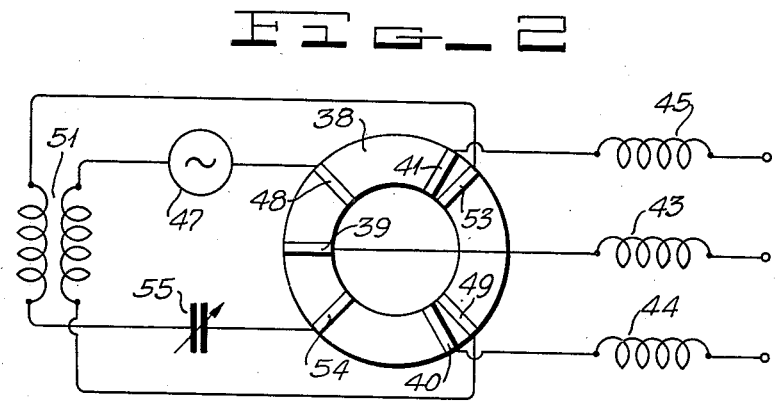
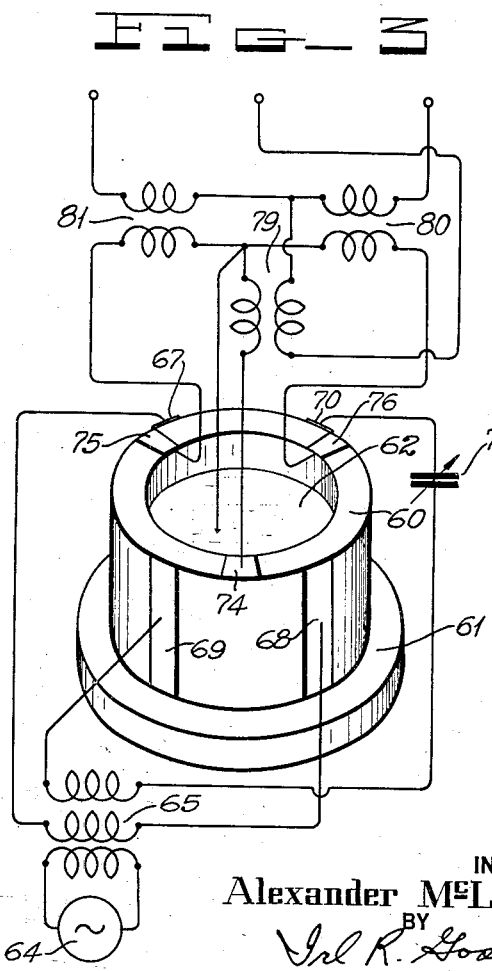

Oct. 2, 1934.   A. McL. NICOLSON   1,975,517
PIEZO ELECTRIC CRYSTAL CONVERTER GENERATOR
Filed May 2, 1931   3 Sheets-Sheet 3
FIG_4
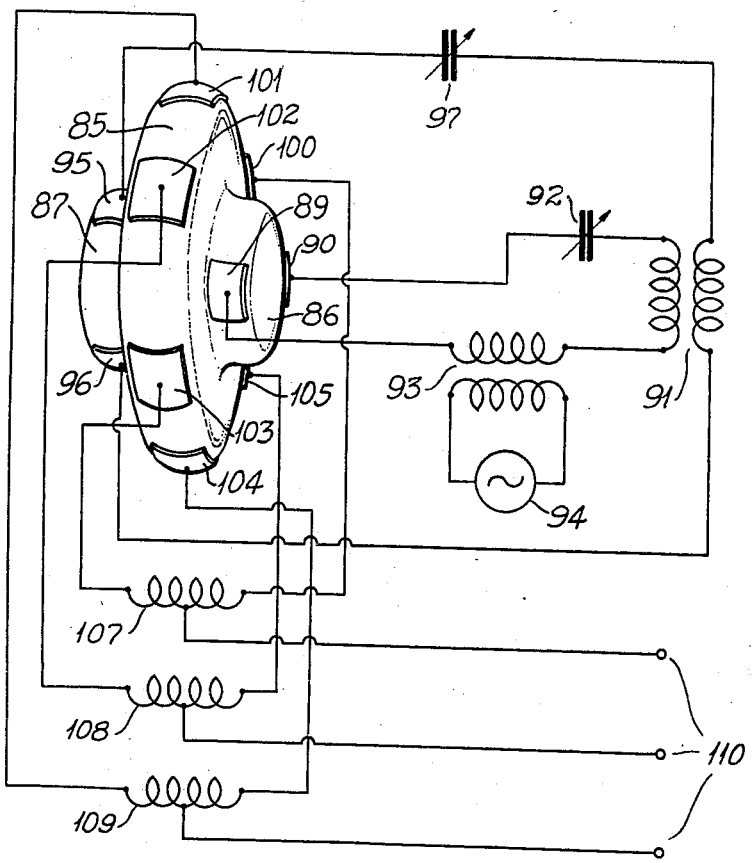
FIG_5
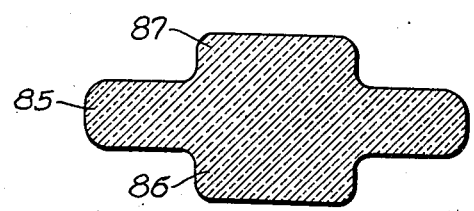
INVENTOR
Alexander McLean Nicolson
BY
ATTORNEY Patented Oct. 2, 1934

1,975,517

UNITED STATES PATENT OFFICE 1,975,517

PIEZOELECTRIC CRYSTAL CONVERTER-GENERATOR

Alexander McLean Nicolson, New York, N. Y., assignor to Communication Patents, Inc., New York, N. Y., a corporation of Delaware Application May 2, 1931, Serial No. 534,530

17 Claims. (Cl. 171—327)

This invention relates to the generation of electrical currents, and particularly to the generation of polyphase currents and voltages.

An object of this invention is to generate electrical currents from crystals having piezoelectric properties.

Another object of the invention is to generate electrical currents of different phase relationships from crystals with piezoelectric properties.

A further object of the invention is to generate three phase currents from a single phase source, a motor-generator piezoelectric crystal being the converting means between the single phase and polyphase currents.

It is well known in the art how crystals having piezoelectric properties may be employed as generators of electrical oscillating currents when used in conjunction with vacuum tubes. It is also well known how piezoelectric crystals may be utilized as resonators and as filter elements. The present invention contemplates using crystals in a manner such that polyphase currents are generated from certain combinations of driving and driven piezoelectric elements.

The method of and apparatus for producing these polyphase currents and particularly three phase currents will be more fully understood by reference to the following description read in conjunction with the accompanying drawings, in which:

Fig. 1 shows a combination of Rochelle salt crystals and a quartz crystal as driving and driven elements, respectively;

Fig. 2 shows a toroidal type of crystal for generating three-phase currents;

Fig. 3 shows a cylindrical type of crystal for producing three-phase currents.

Fig. 4 shows a monolithic crystal section which acts as a converter of quadrature phase currents into three-phase currents; and Fig. 5 shows details of the structure of the crystal of Fig. 4.

Referring particularly to Fig. 1, there is shown a mounting base 5 with vertical supports 6, 7 and 8, of resilient or plastic substance like sponge rubber, on and between which are mounted motor crystals 9 and 10 and a generator crystal 11. The motor crystals are composed of two rectangular plates of Rochelle salt but quartz may be employed as well. These crystals when placed in a field will actually become rhombic shaped instead of square in the case of a square plate, or take the shape of a non-rectangular parallelopiped in the case of a rectangular section. Motor crystals 9 and 10 are shown positioned in quadrature between the plastic or resilient uprights 6 and 7 and abutting the generator crystal 11. Of course the three-fold crystal may be suspended or mounted in any flexible manner suitable for an oscillator. The elements of this structure may be cemented together with Rochelle salt cement as disclosed in my United States Patent No. 1,578,677, of March 30, 1926 or mounted on a steel bolt or vitreous quartz rod or dowel and cemented thereto.

The generator crystal 11 may be either a Rochelle salt or quartz crystal, and in the particular embodiment shown in Fig. 1 is a quartz section cut so that its electrical axes are perpendicular to the faces of the crystal. In other words, the optical axis is along a diameter of the section. Located upon one face of the crystal are three electrodes 15, 16 and 17, and on the reverse side an electrode 18, that may extend over this entire face except where it is cut away to provide for the driving crystal. These electrodes are connected in a star connection through windings 20, 21 and 22, forming the primaries of a three-phase star connected transformer having secondaries 23, 24 and 25, respectively. On the motor crystal 9 are electrodes 27 and 28 connected through a variable condenser 29 to the secondary of a transformer 30. On motor crystal 10 are electrodes 32 and 33 connected directly to a source of single phase energy 34. The source of energy 34 is connected in parallel to the primary of the transformer 30 which supplies electrodes 27 and 28 of the motor crystal 9.

Through the phase shift obtained in the transformer 30 and condenser 29, the potential supply to the motor crystals 9 and 10 will be in quadrature, producing a rotating pressure in the generator crystal 11. That is, pressure will be applied in quadrature sinusoidally, producing in crystal 11 a rotating pressure field which, since it is applied along the electrical axes, will produce at various points thereon various values of potentials. The central electrode on the one face of the crystal will have a fixed status and remain at a definite potential with respect to the variations on the other face of the generating crystal. The pressure is uniformly propagated around the crystal, the speed of movement thereof being independent of the frequency of the source 34. The various positive potentials generated by the crystal 11 and detected by the electrodes 15, 16 and 17 will bear a definite relationship to the primary frequency. The positioning of the electrodes 15, 16 and 17 to obtain exact 120° displacements between the varying potentials may not be comparable with a geometric 120° displacement of the electrodes. Although a uniform pressure propagation is obtained, there will not be a uniform propagation of stresses in the crystal because of its non-uniform crystalline structure. It may be necessary, therefore, to vary the geometric position of the electrodes to angles less or greater than 120°.

Referring to Fig. 2, a toroidal shaped quartz crystal 38 has placed thereon three-phase electrodes 39, 40 and 41, which may be metallic strips encircling the crystal or strips which partially surround that particular portion of the crystal structure. These electrodes are shown connected through the inductances 43, 44 and 45, respectively, to output terminals which may be connected to a work circuit a neutral connection may be made at the load. Quadrature stresses are obtained in crystal 38 from a single phase source of potential 47 directly connected to electrodes 48 and 49 through the primary of a transformer 51. The secondary of this transformer is connected to electrodes 53 and 54 through a variable condenser 55 to impress upon the crystal, in a quadrature relationship, potentials 90° out of phase with those impressed upon the electrodes 48 and 49. This arrangement of the driving forces on the crystal produces a rotating pressure field similar to a rotating magnetic field, the potential relationship of the currents in inductances 43, 44 and 45 being 120° apart. This crystal is cut with its electrical axes perpendicular to the plane of the crystal and as in the case of the crystal in Fig. 1. The position of the three-phase electrodes 39, 40 and 41 may not be 120° apart geometrically, due to the non-uniformity of the crystal structure similarly to the crystal of Fig. 1. Good results will be obtained by employing this principle with the "z" axis or in the case of Rochelle salt the "c" axis perpendicular to the plane of the paper.

In Fig. 3 a cylindrical type of quartz or Rochelle salt crystal 60 is mounted on a base 61 and has placed in the center thereof a pool of mercury 62, which forms a neutral electrode of the three-phase output system. The crystal is driven from a single phase source 64 through a three-winding transformer 65, one primary of which is connected to electrodes 67 and 68 diametrically opposite one another and in a physical quadrature relationship with respect to electrodes 69 and 70. The electrodes 69 and 70 are applied with potential 90° out of phase with the electrodes 67 and 68 through a secondary of the transformer 65 and a variable condenser 71. The alternate quadrature potentials are supplied to the cylindrical crystal to produce a rotating pressure field creating potentials which are detected in a 120° relationship by electrodes 74, 75 and 76 placed 120 electrical degrees apart. These electrodes are connected to the primaries of three phase output transformers 79, 80 and 81. The mercury pool 62 forms the neutral or ground connection of the star connected primaries of the transformers.

Referring to Fig. 4, a piezoelectric crystal structure is shown having three sections 85, 86 and 87. These sections may be cut from a quartz crystal as a monolithic structure with the optical axes perpendicular to the faces of the various sections. It may also be constructed from three separate sections and fastened together with Rochelle crystal cement or bolted as described above, so as to form an extremely firm bond between the various sections and transfer the stresses produced in the driving crystals to the driven crystal. The crystal is cut to have rounded edges as shown in cross-section in Fig. 5 with rounded intersections between elements so that the energy stresses may flow, as along stream lines, more smoothly from one section to the other.

The sections 86 and 87 of the structure are the driving elements, while the centrally disposed section 85 is the generating element of the three-phase system. These elements are all cut to form ellipsoidal sections because of the non-uniformity of the crystal structure along the different elastic axes. That is, the pressure strain created at the center is to appear simultaneously at the circumference of the generating central section and since the velocity of propagation in some directions is greater than in others, the ellipsoidal construction is desirable.

On the motor section 86, diametrically opposed electrodes 89 and 90 are connected through the primary of a transformer 91, a variable condenser 92, and the secondary of a transformer 93. The transformer 93 is supplied from a source of single phase energy 94. The driving section 87 has applied to it through diametrically opposed electrodes 95 and 96 quadrature potentials through the secondary of transformer 91 and a variable condenser 97. The electrodes 89 and 90 are on the major axis of element 86 and electrodes 95 and 96 are on the minor axis of element 87. The application of the quadrature potentials to the elements 86 and 87 in a physical quadrature relationship with respect to the driven element 85, produces in the latter contractions and expansions and consequently electrical potentials which are initiated in the central portion of the element 85 and propagated to the edges thereof with the stresses. On the circumferential portion of the element 85 are found six electrodes 100, 101, 102, 103, 104 and 105 which are placed on the three well known electrical axes of a quartz crystal determined by the original hexagon. The diametrically opposed electrodes are connected through impedances 107, 108 and 109 which may be either inductance or resistance elements. The central portion of these elements are connected to terminals 110 between which a 120° difference in phase relationship exists. Variations may be made in amplitude and the phase relation of the potentials at the terminals 110 by varying the tapped position on the impedances 107, 108 and 109. A single crystal energized as above described in Fig. 4 produced three phase voltages 120 degrees apart with a uniform placement of the pick-up electrodes, these electrodes being connected to the control electrodes of vacuum tubes. Three phase currents differing more or less than 120 degrees have been obtained from an experimental crystal by varying the geometrical positions of these pick-up electrodes. Other methods of producing mechanical stresses such as by varying the positions of the driving electrodes, produced multiphase voltages in accordance with the number and relationship between the pick-up electrodes. The principle of operation is the same in all the modifications described above.

It is to be understood that polyphase currents other than three-phase may be obtained by symmetrically placing the electrodes around the generating crystal at positions having the phase displacement desired. Such equivalent arrangements are intended to be within the scope of the appended claims.

What is claimed is:

1. In a piezoelectric crystal generator, a piezoelectric crystal driving element, a second piezoelectric crystal element mechanically connected to said driving element, a second driving element mechanically connected to said second crystal for producing stresses therein in quadrature, and a plurality of electrodes positioned on said driven crystal for detecting the potentials created therein.

2. In a piezoelectric generator, a monolithic crystal structure, a plurality of electrodes positioned in quadrature on said crystal, means for supplying potentials in quadrature to said electrodes, and a second plurality of electrodes for obtaining potentials in different phase relationships as said crystal is polarized.

3. In a polyphase electrical generating system, a source of single phase potential, means for deriving quadrature phase potentials therefrom, a piezoelectric crystal element, means for applying said quadrature potentials to said crystal element, a transformer, and means for connecting said transformer to said crystal to obtain therefrom potentials having maximum and minimum amplitudes equally spaced with respect to time.

4. In a polyphase current generating system, a source of single phase energy, means for transforming said energy into quadrature phase energy, a toroidal shaped piezoelectric crystal, means for applying at diametrically opposite positions on said crystal said quadrature phase energy, and a plurality of electrodes substantially equally disposed around said crystal for detecting maximum potentials created in said crystal at equal time intervals.

5. In a polyphase current generating system, the combination of a source of single phase potentials, means for transforming said potential into quadrature phase potential, a pair of rectangular shaped driving crystals positioned in a 90° relationship with respect to one another, means for applying one of said quadrature phase potentials to each of said crystals, a generating piezoelectric crystal located intermediate said rectangular shaped crystals, and means positioned on said generating crystal for obtaining polyphase potentials therefrom.

6. A polyphase current generating system in accordance with claim 5, in which said last mentioned means comprises a plurality of electrodes positioned equi-distant with respect to one another around said crystal, and a three-phase transformer connected to said electrodes.

7. In a three-phase current generator, a source of single phase energy, means for obtaining quadrature phase potentials therefrom, a plurality of rectangular shaped Rochelle salt crystals positioned in a 90° relationship with respect to one another, means for applying one phase of said quadrature phase potentials to each of said Rochelle salt crystals, a quartz crystal positioned intermediate said Rochelle salt crystals, and electrodes positioned on said quartz crystal for detecting maximum potentials 120° apart.

8. The method of generating polyphase currents comprising transforming single phase potentials into quadrature phase potentials, applying said quadrature phase potentials to a piezoelectric crystal in quadrature, and detecting polyphase potentials at substantially equi-distant points on said crystal.

9. The method of generating three-phase potentials comprising transforming a single phase potential into quadrature phase potentials, applying said quadrature phase potentials to piezoelectric driving elements, and detecting in a piezoelectric driven element three-phase potentials from electrodes displaced substantially 120° with respect to one another around said driven element.

10. In an electrical polyphase generating system, a piezoelectric crystal having a large central portion and two substantially equal smaller portions on opposite sides of said central portion, means for applying quadrature phase potentials on electrodes positioned in a 90° relationship with respect to one another on said smaller portions, and means positioned on the circumference of said larger portion and equally spaced with respect to one another to detect potentials created thereat.

11. In a three-phase electrical generating system, the combination of a crystal having a central portion and two smaller portions on opposite sides of said central portion, all of said portions being ellipsoidal in shape, a pair of electrodes diametrically opposite one another on one of said smaller portions, a second pair of electrodes positioned diametrically opposite one another on said second smaller portions, said second pair of electrodes being 90° displaced with respect to said first pair of electrodes, a plurality of electrodes equally spaced on the periphery of said larger portion, and impedances interconnecting said electrodes in pairs, the mid-points of said impedances providing three-phase potentials.

12. The method of converting single phase voltage into polyphase voltages comprising transforming a single phase voltage into quadrature phase voltages, applying said quadrature phase voltages to a piezoelectric crystal structure in such a manner as to set up mechanical stresses at right angles and in quadrature which compose to produce a rotating stress, and detecting polyphase voltages set up by said rotating stress at substantially equidistant points on said structure.

13. In a piezoelectric generator, a crystal structure, a plurality of electrodes positioned in quadrature on said structure, means for supplying voltages in quadrature to said electrodes, and a second plurality of electrodes for obtaining voltages in different phase relationships as said crystal structure is polarized.

14. In a piezoelectric generator, an arrangement of material having piezoelectric properties, a plurality of electrodes positioned in quadrature on said material, means for supplying voltages in quadrature to said electrodes, and a second plurality of electrodes for obtaining voltages in different phase relationships as said piezoelectric material is polarized.

15. In a system for converting single phase voltage into polyphase voltages, the combination of a piezoelectric element, a single phase voltage source, means for connecting said single phase voltage source to said piezoelectric element for setting up a traveling mechanical stress in said element, and means for obtaining polyphase voltages at different points on said element as said element is polarized.

16. In a system for converting single phase voltage into polyphase voltages, the combination of a piezoelectric element, a single phase voltage source, a plurality of electrodes on said piezoelectrical element connected to said single phase voltage source in such a manner as to set up a traveling mechanical stress in said element, and a second plurality of electrodes for obtaining polyphase voltages as said element is stressed.

17. In a system for converting electrical energy from a source having a certain phase relationship into electrical energy of a different phase, the combination of a piezoelectric element, means for connecting said source to said piezoelectric element for setting up a traveling mechanical stress in said element, and means for obtaining energy of a different phase from said piezoelectric element as said element is energized by said source.

ALEXANDER McLEAN NICOLSON.